United States Patent [19]

Bennett, III et al.

[11] Patent Number: 4,681,769
[45] Date of Patent: Jul. 21, 1987

[54] SPICE OLERESIN EXTRACTION PROCESS

[75] Inventors: Robert B. Bennett, III, Garden Grove; Donald W. Wagner, Ivanhoe, both of Calif.

[73] Assignee: Universal Foods Corporation, Milwaukee, Wis.

[21] Appl. No.: 799,295

[22] Filed: Nov. 20, 1985

Related U.S. Application Data

[63] Continuation of Ser. No. 482,318, Apr. 5, 1983, abandoned.

[51] Int. Cl.$^4$ .......................... A23L 1/221; A23L 1/27
[52] U.S. Cl. ..................................... 426/540; 426/429; 426/430; 426/651; 426/655; 426/476
[58] Field of Search ............... 426/429, 651, 430, 540, 426/655, 476

[56] References Cited

U.S. PATENT DOCUMENTS

| | | | |
|---|---|---|---|
| 2,571,867 | 10/1951 | Hall et al. | 426/429 X |
| 3,071,475 | 1/1963 | Stohr | 426/613 |
| 3,732,111 | 5/1973 | Berner et al. | 426/429 X |
| 4,069,351 | 1/1978 | Yano et al. | 426/429 X |

FOREIGN PATENT DOCUMENTS

| | | | |
|---|---|---|---|
| 2011936 | 3/1970 | France | 426/651 |
| 4257 | of 1878 | United Kingdom | 426/429 |

OTHER PUBLICATIONS

Perry, Chemical Engineers' Handbook, 3rd Ed., 1950, McGraw-Hill: New York, pp. 713-718.
Merory, Food Flavorings, 1960, Avi: Westport, Conn., pp. 76-77.

*Primary Examiner*—Joseph Golian
*Attorney, Agent, or Firm*—Donald A. Peterson; Herbert D. Hart, III

[57] ABSTRACT

A process is provided for preparing a naturally flavored and colored oleresin spice edible oil extract by contacting ground spice with fortified edible oil to extract flavor and color from the spice followed by pressure separation and blending the extracted spice residue with fresh oil to form a fortified oil containing spice color and flavor for recycling in the extraction process.

8 Claims, 1 Drawing Figure

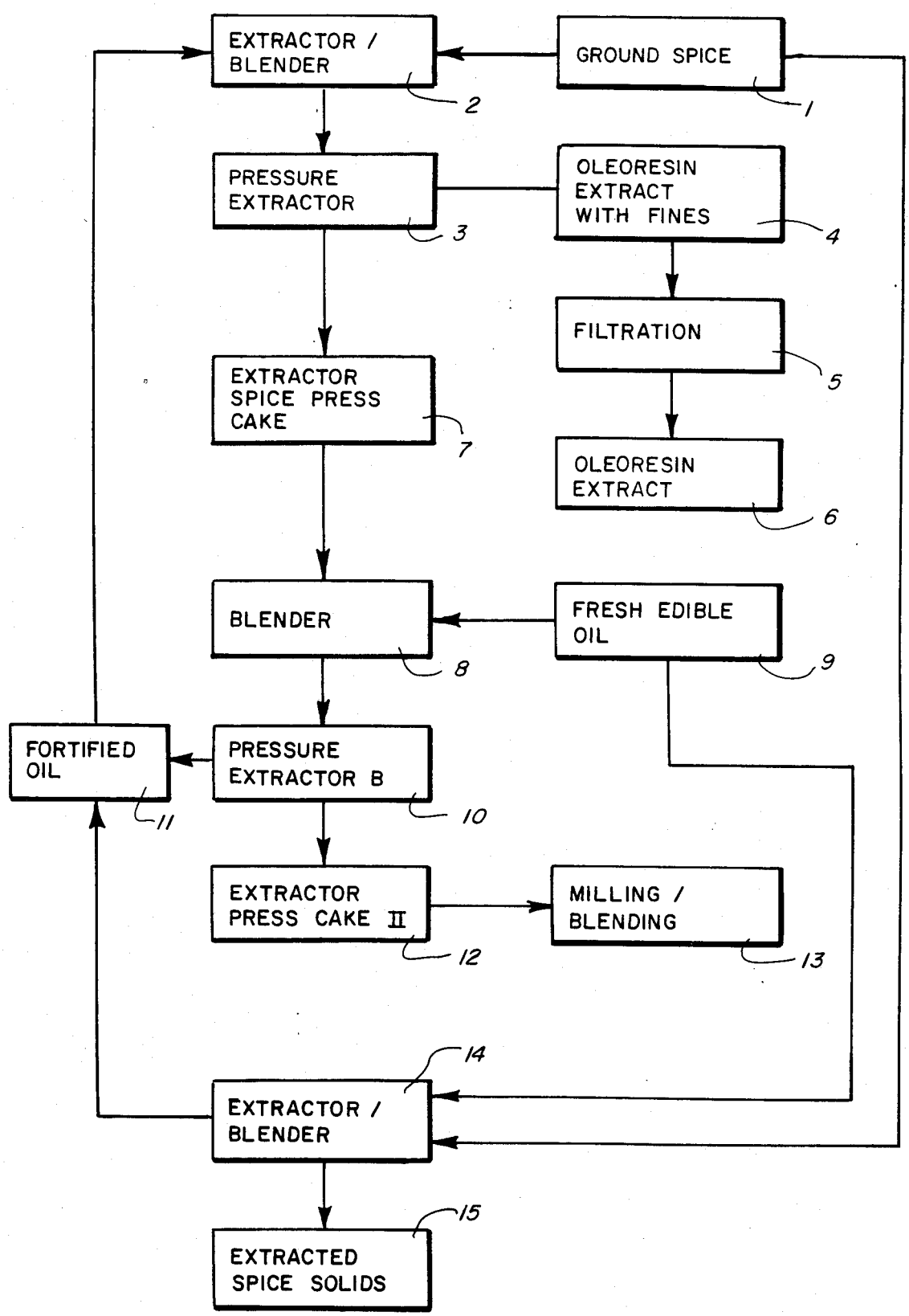

4,681,769

SPICE OLERESIN EXTRACTION PROCESS

This is a continuation of application Ser. No. 482,318, filed Apr. 5, 1983, and now abandonment.

BACKGROUND OF THE INVENTION

1. Field Of The Invention

This invention relates to the preparation of extracts of natural flavor and color elements from pure ground spice by the extraction of spice with fortified edible oils used as a solvent. The extracts so produced are commonly called oleoresin extracts.

2. Description Of The Prior Art

Spice oleoresins are commonly used as an enhancement to foods, particularly as a flavor and/or color additives in the preparation and consumption of foods. Capsicum (or chili) spice is popular as such an enhancement, and oleoresins of the spice are commonly used as a color additive.

Current oleoresin extraction technology utilizes procedures which include the use of heat, organic solvents (sometimes chlorinated), steam injection and high vacuum. The use of heat, steam and vacuum destroy some of the carotenoid pigment, and almost all the flavor of the natural oleoresin. Organic solvents leave an objectionable residue in the oleoresin and spent chili solids. Undesirable natural substances such as gums or varnishes may be extracted with the oleoresin and remain in the oil, causing problems of flowability, streaking and others.

Some processes, such as Hall, U.S. Pat. No. 2,571,867 teach the use of the essential oil of spice for the extraction of a spice solid. The essential oil is obtained in the first instance by the steam distillation of the spice. This process generally involves contacting freshly ground spice with an essential oil or oleoresin of spice in a sealed container at elevated temperatures (180° F.) for one hour to extract oleoresin from the spice. The supplemented essential oil of spice is recovered from the extracted spice solids by filtration and the spice cake residue washed with vegetable oil at 220° F. The first supplemented essential oil extract obtained as a filtrate is then used for a second extraction of fresh ground spice, and after separation by filtration, the residual spice cake is again extracted with vegetable oil. The vegetable oil washings may be combined with the essential oil extracts, if desired.

Stohr, U.S. Pat. No. 3,071,475 teaches the preparation of a suspension of herb powders and flakes in a heated edible oil.

Berner, U.S. Pat. No, 3,372,111 teaches the use of heated vegetable oil to extract the antioxidant principles from spices and subsequent sparging with steam (at 175° C.) to remove odor and flavor factors.

The present invention makes use of an edible oil as a solvent for spice extraction and accomplishes the extraction without the use of heat or steam or the use of toxic solvents. It greatly simplifies the extraction process, makes more economical use of spice ingredients and produces a colored edible oil extract with spice flavor.

OBJECTS OF THE INVENTION

Accordingly, one of the objects of the present invention is the provision of a process which will provide a high quality capsicum/chili spice oleoresin extract which is gum free and retains the natural flavor of the capsicum spice.

Another object of this invention is a process for the fortification of an edible oil with natural flavor and color of capsicum spice in which there is a high retention of color pigmentation in the oleoresin product.

A further object is the production of an edible oleoresin extract and an extracted comminuted spice product which are free of contamination and suitable for use in or as food products.

An additional object is to provide a method of producing edible oleoresin extracts which does not require the use of heat, steam or chlorinated solvent, known to cause oxidation and/or contamination of the spice and oleoresin.

Various other and ancillary objects and advantages of the invention will become apparent from the following description and explanation of the invention given in connection with the accompanying drawings.

SUMMARY OF THE INVENTION

The foregoing objects are achieved by a process for preparing a natural colored and flavored oleoresin spice extract in an edible oil medium which comprises the steps of:

(a) contacting a freshly ground spice containing volatile and non-volatile oleoresins with an edible oil such as vegetable oil fortified with oleoresin spice extract, under normal ambient temperature conditions to extract a portion of the color and flavor oleoresin principles from said spice;

(b) separating the edible oil containing extracted spice color and flavor from the extracted spice solids by the use of pressure to obtain a spice oleoresin extract containing color and flavor principles of the extracted spice;

(c) optionally separating spice fines from the spice oleoresin extract from step (b) to produce a spice oleoresin extract product;

(d) re-blending the extracted spice cake from step (b) with fresh, unfortified edible oil to extract residual further color and flavor principles from the extracted cake of spice solids at ambient temperature conditions to produce a fortified edible oil;

(e) separating the fortified edible oil spice extract from step (d) for recycle as a fortified edible oil in step (a).

DETAILED DESCRIPTION OF THE INVENTION

Reference is made to the attached drawing, which represents in the flow diagram form, embodiments of the process.

The process in the principal steps shown in the flow chart illustrates a supply of ground capsicum spice at 1, and a supply of spice oleoresin fortified edible oil such as vegetable oil shown at 11 which are fed to an extractor blender shown at 2.

At the start-up of the process for the initial spice oleoresin extraction, it is necessary to prepare a spice oleoresin fortified oil by admixing fresh edible oil from source 9 with ground spice from 1 to provide an extract of oleoresin of spice in vegetable oil at extractor blender 14.

In any subsequent carrying out of the process after the start-up phase, the spice oleoresin fortified oil from 11 will be supplied as a product of the second phase of the second pressure extraction step shown at 10. Box 2 represents a blending/extraction of the oleoresin of fresh spice from source 1 with fortified oil from 11, preferably carried out as a batch infusion for a period of time of from about fifteen (15) minutes to twenty-four (24) hours, and using variable proportions of spice and oil.

After extraction of spice oleoresin from fresh ground spice with spice oleoresin fortified oil at blender extractor station 2, the oil-spice mixture is separted by use of a pressure extractor shown at 3 into a liquid spice oleoresin edible vegetable oil extract fraction shown at 4 which contains enhanced amounts of natural color and flavor properties of the spice (oleoresin) together with some spice fines which may be removed by filtration at 5, and a solid extractor ground spice press-cake fraction shown at 7. The extractor that has been successfully used is a French Oil Press Model No. F-44, a screw-type/or auger-type extractor equipped with an adjustable cage-like screen and orifice. The pressures employed in the extractor shown at 3 are over a gradient of from essentially little or no pressure up to 500 psi.

A similar second extraction/separation procedure is carried out on the extractor spice press-cake fraction or effluent product 7 from the first separation by pressure extraction at 3, by blending the once extracted spice presscake at station 8 with fresh edible oil from source 9. This second blending/extraction is carried out under substantially the same low temperature conditions as the first blending/extraction at 2 followed by pressure/extraction at station 10. The spice oleoresin fortified oil effluent fraction shown at 11 from the second pressure/extraction step shown at 10, may then be recycled for use to extract fresh ground spice such as chili from source 1 in the first blending/extraction step shown at 2 and pressure/extraction and separation step shown at 3.

The present process is adaptable for extracting the natural flavor and color elements, e.g., oleoresin from any spice such as cummin of which chili is a preferred example. The process also be adapted to produce a blend of spice oleoresin extracts in edible oil having oleoresin flavor and color elements from two or more spices, by using different spices in the two separate extraction stages shown.

The natural spice flavor and color elements are extracted from the spice with an edible oil, preferably vegetable oils although edible animal oils or blends of animal and vegetable oils may be used. The oil should preferably exist in a liquid state in the temperature range of 70° to 85° F. A preferred vegetable oil is soy bean oil, but corn oil, safflower oil, peanut oil or the like can also be used.

The extraction is accomplished by blending ground chili spice [mesh size 3-40 (U.S. Standard Sieve Series)] with spice fortified oil. For the first extraction performed, as indicated above, it will be necessary to prepare a fortified oil by mixing edible oil oleoresin with the ground spice to form an extract which is separated from the spice solids. From then on the oleoresin fortified oil will be supplied as a by-product of the second phase of the extraction process also as shown above.

As an example of this method, the chili spice is blended with the fortified oil in a preferred ration (by weight) of eight to one (8:1). The contact time is variable, however, for chili extraction the optimum contact time is between 16 (sixteen) and 24 (twenty-four) hours. The initial blending/extraction takes place at atmospheric pressure and normal ambient temperature, i.e., 75°–85° F. Temperatures above 100° F. should be avoided inasmuch as higher temperatures cause oxidation with a resultant destruction of delicate flavor and/or color principle.

Following the first blending/extraction process, the mixture is separated. Separation is accomplished by a pressure extraction to remove as much oil as possible for the extracted spice cake. The preferred pressure extraction/separation method is by use of an auger or screw-type extractor. A particularly useful apparatus for this purpose is known as the French Oil Mill Machinery Company oil press, Model F-44. The products obtained by this method will be an oleoresin extract with fines, and an extractor press cake. The edible oil oleoresin extract is filtered to remove the minor amount of residual spice fines and to yield the finished edible oil oleoresin extract essentially free of suspended spice solids. The edible oil extract contains the natural flavor and color elements of the spice. As one example, when a ground chili spice having a minimum initial ASTA color level of about 200 is used in the method, the resultant spice oleoresin extract in oil will have an ASTA level of approximately 1200 to 1500 and the extracted spice cake an ASTA of about 60 to 100.

The spice press cake recovered from the pressure extraction step is then re-blended with pure edible oil preferably of the same type as the fortified oil used for the first spice extraction step. As in the case of the first blending procedure, contact time may vary, but for chili spice extraction, it is preferred that the contact/extraction time be between 16 (sixteen) and 24 (twenty-four) hours. The mixture of spice and fortified oil extract is then separated by the same pressure extraction method described above to yield a fortified oil with fines and the final extractor press cake. The fortified oil with fines is then used in the subsequent blending with pure ground chili spice.

The extractor press-cake is also one of the final commercially useful products of the process. One particular advantage of this extraction method is the useability of this final extracted spice product. It may be milled or otherwise comminuted, subjected to further processing, or be used as a food product itself. For example, if the original fresh ground chili spice has an ASTA color level of about 150, the final extractor presscake will have an ASTA level of approximately 60. The extracted press cake as such is particularly useful as an ingredient in dry spice blends. Since there will be some flavor and color reduction, in the extracted spice, the extracted spice product is appropriate for use where a milder flavor is desired.

Although maintaining low temperatures is a concern throughout the process, it is particularly necessary to do so during the pressure separation and extraction steps. Temperature control is accomplished in the case of the French oil press by two method means: (1) cooling water circulated in the hollow auger of the press; and (2) the water cooling jacket of the press chamber as a means of heat dissipation.

The operation of the French oil press may be varied. In one preferred embodiment using a ground chili spice having an ASTA color of 150, maintaining the prescribed contact time of 16 (sixteen) to 24 (twenty-four) hours, using an orifice outlet diameter Model F-44 on the French Oil Press of 0.062 inches and a flow rate of 800 pounds per hour, produces an edible oil oleoresin extract having an ASTA of 900 to 2000 and a solid residual extracted chili powder of an ASTA value of about 60.

The ASTA color levels referred to are from the methods set forth in the Official Analytical Methods of the American Spice Trade Association (ASTA), Published by the American Spice Trade Association, Inc. of New York 1968 as revised: The extract color refers to spectrophotometer absorption of acetone extracts of capsicums and oleoresins, Method 20.1.

EXAMPLE

The following example is a two-step production run.

One lot (16 Bbls) comprising about 3840 pounds of low moisture, 160 ASTA, at 20 mesh (USSS), of fresh ground chili is transferred to a ribbon blender and blended with 525 pounds of fortified soybeam oil having 500 ATA oleoresin. This mixture is permitted to stand at room temperature (75° F.) and then blended for 15 minutes before transfer of 1000 pounds of the mix to the feed hopper of a Model 44-F French oil press. The blender is then stopped and only restarted when necessary to replenish the feed hopper. The feed hopper provides for a controlled flow of the mixture of chili and fortified to the press at a rate of 800 pounds per hour, at this feed rate and a cone setting of 0.030 inches the press develops 500 pounds per square inch cone pressure. Effluent oil temperatures are maintained at from about 75° to about 80° F. by means of cooling water.

With the press operating as described, the oil extracted assays at approximately 1000 ASTA and the spice press cake fraction has a correspondingly reduction in ASTA values to about 60. The extracted oil is cleared of granular spice fines by filtration and standardized at 1000 ASTA. This product contains the flavor and odor elements of chili as well as the desired coloring.

The press-cake of once extracted ground fresh spice from the first pressing is further processed following the same procedure above described for the first blending/pressure extraction sequence, using however fresh vegetable oil instead as an additive in place of the fortified oleoresin oil having a 500 ASTA value. The fortified soybean oil extracted assays at approximately 500 ASTA and is recycled as an extractant on fresh ground chili. The extracted chili powder cake from this extraction step has a correspondingly reduction in ASTA value (about 60) and can be used as an ingredient in finished capsicum products or blended with other ground chili products of higher ASTA values.

It has also been determined that moisture content of the ground spice is a factor in the recovery of the spice oleoresin by the process of the present invention. For example, if the ground spice has higher moisture levels, then the spice press-cake resulting from the extraction process has higher residual oil contents and the process is not as efficient in the extraction of spice oleoresin from the ground spice. Particularly, a moisture content in the ground spice of greater than about 8%, e.g. 10 to 15% water, then the oil residue in the press cake increases from levels of about 10% (in the case where the process is carried out on spice having an 8% moisture in content) to about 15% residual oil in the press cake, in the case of spice having a moisture content of 10 to 12%. Accordingly moisture content of the ground spice should be no greater than about 8%. Additionally, if the spice moisture content is above 8%, some water is removed in the pressure extraction process resulting in the formation of undesirable gums. If this gum formation occurs, the gum may be removed by filtration or decantation procedures or preferably by continuous centrifugation.

It has also been found that the instant procedure for obtaining improved spice oleoresin extracts having both high ASTA color values as well as flavor, may be modified to produce an edible oil spice oleoresin extract with high color values without flavor where the flavor is not desired. Particularly, it has been found that the flavor elements present in the spice oleoresin extract may be removed with minimal deliterious effect to or minimal diminishment of the color values of the oil extract, by a stripping operation. The stripping involves discharge under pressure of the edible oil extract through a small orifice or nozzle mixed with and simultaneously with a steam sparge into a low pressure or vacuum chamber continuously maintained under vacuum. The contact of the oil extract with the steam is of very brief duration (in the nozzle) so as not to substantially raise the temperature of the oil extract. The steam, is believed to function in the fashion of a steam distillation effect on discharge of the mixed steam/extract oil with volatile flavors into the low pressure chamber thereby causing the ready vaporization of the volatile flavor components of the extract.

The flavor components are thus removed as gaseous vapor continuously from the chamber and the deflavored, colored vegetable oil extract as liquid from the vacuum discharge chamber.

It is believed that the invention and many of its ancillary advantages will be apparent from the foregoing description. It is also thought that it will be understood that various changes may be made in the ingredients, their composition and the parameters of the steps without departing from the spirit and scope of the invention.

I claim:

1. A process of preparing a naturally colored spice oleoresin edible oil extract with substantially no flavor elements comprising the steps of:
   (a) contacting and blending fresh ground spice with a fortified edible oil extract of spice oleoresin flavor and color at ambient temperature not exceeding 100° F. and atmospheric pressure for a period of from about 15 minutes to about 24 hours to extract additional natural flavor and color elements from said fresh spice with said fortified oil;
   (b) separating the further fortified spice oleoresin edible oil extract product from the once extracted solid spice residue by pressure extraction while at temperatures not exceeding 100° F.;
   (c) contacting said once extracted spice residue with fresh edible oil for a period of from about 15 minutes to about 24 hours and at atmospheric pressure to extract from said extracted solid spice residue additional natural flavor and color elements to form a fortified spice oleoresin edible oil;
   (d) separating the fortified spice oleoresin edible oil extract from the twice extracted solid spice residue under pressure, at ambient temperatures not exceeding 100° F.;
   (e) recycling the fortified spice oleoresin edible oil for blending with fresh ground spice in the process and further enhancement of its spice oleoresin color, flavor and odor values;
   (f) simultaneously discharging a stream of said spice oleoresin edible oil extract containing color and flavor components through a nozzle simultaneously with steam into a reduced pressure chamber, the amount and time of contact of said steam with the spice oleoresin oil extract being such as to not raise the temperature of said extract to a point to adversely affect the color; and (g) recovering the liquid, colored, deflavored, edible oil extract from the chamber and discharging from said chamber the flavor elements as a gaseous vapor component.

2. A process according to claim 1, wherein pressure extraction at pressures of up to about 500 psi is employed to separate edible oil extract containing natural spice oleoresin flavor and color elements from ground spices.

3. A process according to claim 1 wherein the edible oil is vegetable oil.

4. The process according to claim 3 wherein the oil is soybean oil.

5. A process according to claim 1 wherein the fresh ground spice has a particle size ranging from about 3 to 40 mesh (U.S. Standard Sieve series).

6. A process according to claim 1 wherein the edible oil extract produced by the process has ASTA values of from about 1200 to 2000 as determined by ASTA Method 20.1.

7. A process according to claim 1 wherein the spice is chili.

8. A process according to claim 1 wherein the fresh ground spice is contacted with spice oleoresin fortified oil for a period of from 16 to 24 hours.

* * * * *